(No Model.)

W. A. DOBB.
COMBINED HARROW AND COTTON PLANTER.

No. 326,206. Patented Sept. 15, 1885.

WITNESSES
Rey C. Bowen
E. G. Siggers

INVENTOR
William A. Dobb.
By C. A. Snow & Co
his Attorneys.

UNITED STATES PATENT OFFICE.

WILLIAM A. DOBB, OF SMITHVILLE, MISSISSIPPI.

COMBINED HARROW AND COTTON-PLANTER.

SPECIFICATION forming part of Letters Patent No. 326,206, dated September 15, 1885.

Application filed July 7, 1885. (No model.)

*To all whom it may concern:*

Be it known that I, WILLIAM A. DOBB, a citizen of the United States, residing at Smithville, in the county of Monroe and State of Mississippi, have invented a new and useful Improvement in Combined Harrow and Cotton-Planter, of which the following is a specification, reference being had to the accompanying drawings.

My invention relates to a combined harrow and cotton-planter, the object being to provide a combined device of this character which shall be simple in its construction, strong and durable, effective in its operation, and one that will not be likely to get out of order.

A further object of the invention is to so mount the seed-cylinder that it will move vertically when an obstruction is encountered without lifting or interfering with the movement of the harrow.

With these ends in view the invention consists in the improved construction and combinations of parts hereinafter fully described, and pointed out in the claims.

Figure 1:
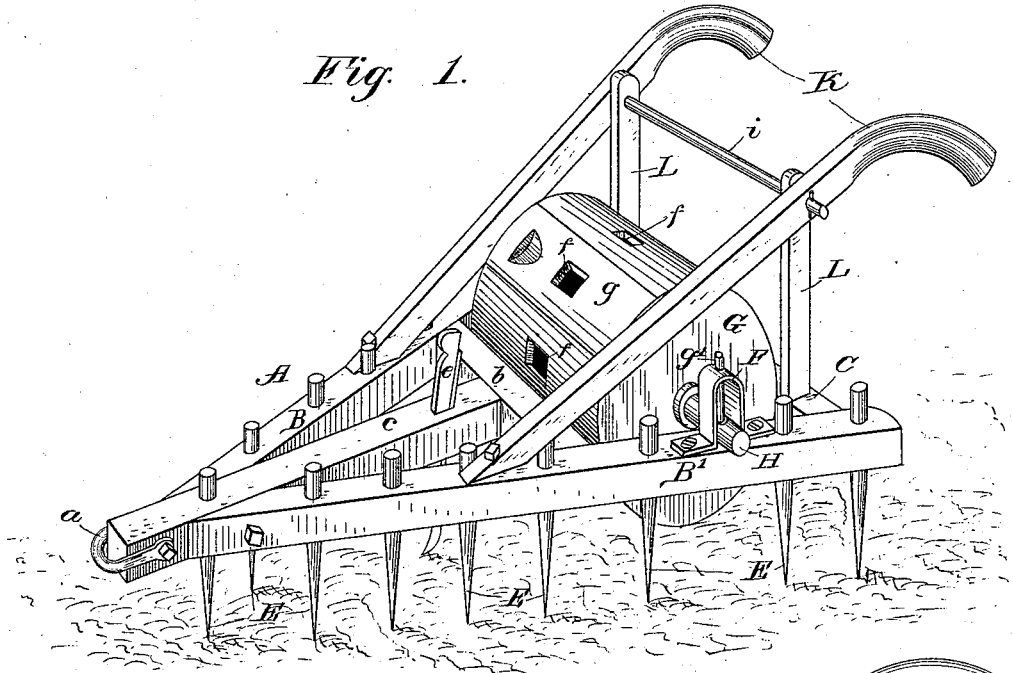
Figure 2:
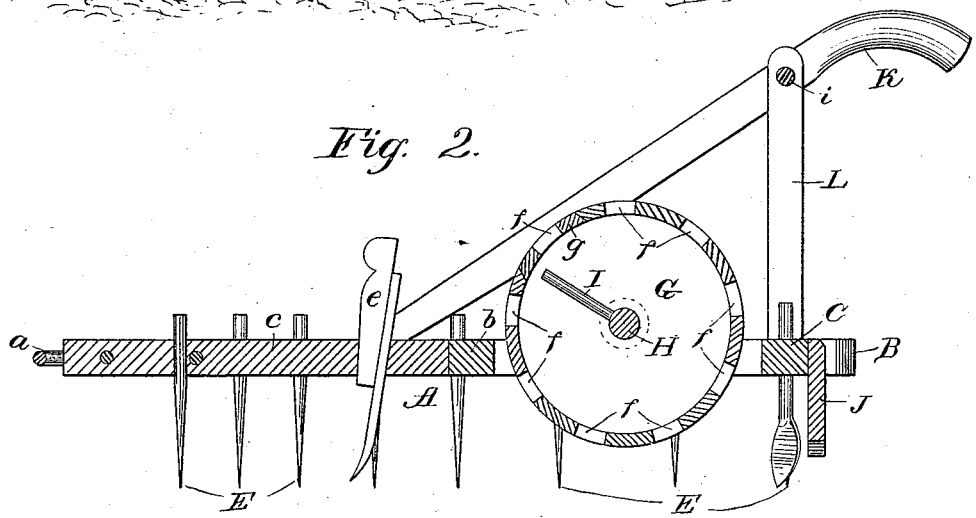
Figure 3:
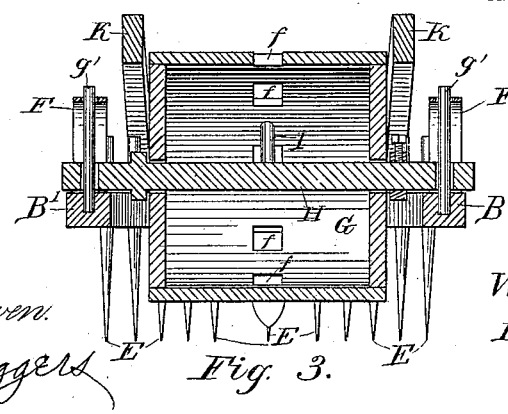

In the drawings, Figure 1 is a perspective view of a combined harrow and cotton-planter constructed in accordance with my invention. Fig. 2 is a longitudinal vertical section, and Fig. 3 is a transverse section taken centrally through the hopper.

In the accompanying drawings, in which like letters of reference indicate corresponding parts in all the figures, A represents the harrow-frame, which consists of the beams B B', secured together at their forward ends and diverging at their rear ends. The rear ends of said beams are connected by a cross or tie beam, C. It will thus be seen that a triangular or V-shaped frame is provided. At the forward or front end of the harrow-frame I have provided a clevis, $a$, to which any suitable draft attachment is to be secured.

E represents harrow-teeth, which are located on the beams B B', said teeth passing through openings in the beams. The teeth are smallest at their lower ends and gradually increase in diameter as they near their upper ends, from which it will be seen that when the teeth are driven in the openings they will be firmly and securely held in place. The beams B B' are connected a short distance from their front end by a beam, $b$, and connecting said beam $b$, midway its ends, with the front end of the frame is a beam, $c$. This beam $c$ is provided with a hole or opening, in which is located an opening-shoe, which shoe is held in place at any desired adjustment or degree of inclination by a wedge, $e$.

Extending upwardly from the upper sides or faces of the beams B B' are inverted-U-shaped brackets F.

G represents the seed-cylinder, which is mounted to turn loosely on a shaft, H, said shaft having shoulders which abut against the outer sides of the ends of the cylinder, and thus hold it against movement on the shaft. The cylinder is provided with a series of radially-arranged dropping-openings, $f$, and is also provided with a seed-slide, $g$, whereby the seed may be poured into the cylinder. An arm, I, extends outwardly from the shaft within the cylinder and serves as a stirrer. The ends of the shaft H are located in the U-shaped brackets, and passing through openings formed near the outer ends of the shaft are vertically arranged rods $g'$, the upper ends of which are secured to the brackets, while their lower ends are secured to the beams. By this arrangement it will be apparent that should the seed-cylinder strike a stone or other obstruction the shaft will be lifted on the vertical rods without interfering in the least with the operation of the harrow.

At the rear end of the frame is provided a coverer, J, which projects downwardly from the beam C.

K represents handles, which are bolted at their forward ends to the beams B B', while their rear ends are secured to the upper ends of standards L, which are connected and braced by a bar, $i$.

Having thus described my invention, I claim—

1. The combination, with a supporting-frame, of the vertically-movable non-rotating shaft having the stirrer-arm, and the seed hopper or cylinder mounted to rotate on said shaft, substantially as described.

2. The combination, with the harrow having the vertical rods $g'$, of the shaft H, arranged to slide vertically on said rods, and having the stirrer-arm I, and the seed hopper or cylinder mounted to rotate on the shaft H, substantially as described.

In testimony that I claim the foregoing as my own I have hereto affixed my signature in presence of two witnesses.

WILLIAM A. DOBB.

Witnesses:
R. M. CONDREY,
S. C. PARHAM.